(12) United States Patent
Zydek et al.

(10) Patent No.: US 11,577,647 B2
(45) Date of Patent: Feb. 14, 2023

(54) SURROUND VIEW BY DRONES

(71) Applicant: Continental Automotive Systems Inc., Auburn Hills, MI (US)

(72) Inventors: Bastian Walter Zydek, Cupertino, CA (US); Dominik Froehlich, Ferndale, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 382 days.

(21) Appl. No.: 16/708,588

(22) Filed: Dec. 10, 2019

(65) Prior Publication Data

US 2020/0207273 A1   Jul. 2, 2020

Related U.S. Application Data

(60) Provisional application No. 62/785,329, filed on Dec. 27, 2018.

(51) Int. Cl.
*B60R 1/00* (2022.01)
*G06T 7/70* (2017.01)
*B64C 39/02* (2023.01)
*B64U 101/30* (2023.01)

(52) U.S. Cl.
CPC ............ *B60R 1/003* (2013.01); *B64C 39/024* (2013.01); *G06T 7/70* (2017.01); *B60R 2300/105* (2013.01); *B60R 2300/607* (2013.01); *B60R 2300/802* (2013.01); *B64U 2101/30* (2023.01); *B64U 2201/20* (2023.01); *G06T 2207/30252* (2013.01)

(58) Field of Classification Search
CPC .............. B60R 1/003; B60R 2300/105; B60R 2300/607; B60R 2300/802; G06T 7/70; G06T 2207/30252; B64C 39/024; B64C 2201/127; B64C 2201/146
USPC ............................................................ 701/2
See application file for complete search history.

(56) References Cited

U.S. PATENT DOCUMENTS

| 9,371,133 B2 | 6/2016 | Mays | |
|---|---|---|---|
| 2016/0129999 A1 | 5/2016 | Mays | |
| 2018/0141658 A1 | 5/2018 | Baur | |
| 2019/0033459 A1* | 1/2019 | Tisdale | G06V 20/56 |
| 2019/0121522 A1* | 4/2019 | Davis | H04N 9/3185 |

FOREIGN PATENT DOCUMENTS

GB          2559753 A          8/2018

OTHER PUBLICATIONS

International Search Report and the Written Opinion of the International Searching Authority dated Mar. 6, 2020, for the counterpart PCT Application No. PCT/2019/066166.

* cited by examiner

*Primary Examiner* — Gertrude Arthur Jeanglaude

(57) ABSTRACT

An apparatus includes a visual display to be viewed by a vehicle occupant. At least one drone includes a camera. A controller is configured to receive images from the camera on the at least one drone and generate an overhead view of the vehicle based on the images received from the at least one drone and display the overhead view on the visual display.

19 Claims, 2 Drawing Sheets

SURROUND VIEW BY DRONES

CROSS-REFERENCE TO RELATED APPLICATIONS

This application claims the benefit of U.S. Provisional Application No. 62/785,329 filed on Dec. 27, 2018.

BACKGROUND

A vehicle can include a plurality of cameras that generate images of vehicle position that are combined together to present the driver with an overhead view of a position of the vehicle in relation to a surrounding environment. This type of visual display can assist the driver when maneuvering in tight constraints. In certain situations, the coverage provided by the cameras may be insufficient to fully understand the position of the vehicle in relation to the surrounding environment.

SUMMARY

In one exemplary embodiment, an apparatus includes a visual display to be viewed by a vehicle occupant. At least one drone includes a camera. A controller is configured to receive images from the camera on the at least one drone and generate an overhead view of the vehicle based on the images received from the at least one drone and display the overhead view on the visual display.

In a further embodiment of any of the above, the vehicle is coupled to a trailer and the overhead view shows both the vehicle and the trailer.

In a further embodiment of any of the above, the vehicle is provided with at least one camera to generate vehicle position data for the overhead view of the vehicle. The at least one drone is used to extend a visualization area to include position data for the trailer.

In a further embodiment of any of the above, the at least one drone is deployed from the vehicle, the trailer, or nearby infrastructure.

In a further embodiment of any of the above, the visual display displays images generated by at least one camera associated with the vehicle.

In a further embodiment of any of the above, the at least one camera includes a plurality of camera.

In a further embodiment of any of the above, the overhead view includes a 360 degree surround overhead view of the vehicle.

In a further embodiment of any of the above, the at least one drone is maneuvered by the vehicle occupant via HMI.

In another exemplary embodiment, a method of providing an overhead view of a vehicle includes (a) deploying at least one drone in response to the vehicle on a drivable surface encountering a visual obstruction relative to the vehicle, (b) generating an overhead view of the vehicle based at least on images from the at least one drone and (c) displaying the overhead view on a visual display.

In a further embodiment of any of the above, step (a) includes deploying the at least one drone from a docking station on at least one of the vehicle, a trailer coupled to the vehicle, or nearby infrastructure.

In a further embodiment of any of the above, step (b) includes generating the overhead view of the vehicle based on images from the at least one drone and images from at least one camera associated with the vehicle.

In a further embodiment of any of the above, the at least one drone extends a field of view surrounding the vehicle beyond a field of view of the at least one camera on the vehicle.

In a further embodiment of any of the above, the visual obstruction relative to vehicle includes reversing the vehicle along the drivable surface.

In a further embodiment of any of the above, the visual obstruction relative to the vehicle includes a structure adjacent the drivable surface.

In a further embodiment of any of the above, step (a) includes maneuvering the drone based on a position of the vehicle relative to the drivable surface.

In a further embodiment of any of the above, the position of the vehicle relative to the drivable surface includes the vehicle at an intersection of multiple drivable surfaces.

In a further embodiment of any of the above, the vehicle is coupled to a trailer.

In a further embodiment of any of the above, step (b) includes modifying the overhead view of the vehicle based on input from a vehicle occupant.

In a further embodiment of any of the above, the at least one drone is maneuvered via HMI to modify the overhead view of the vehicle.

In a further embodiment of any of the above, the overhead view includes a 360 degree surround exterior view of the vehicle.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
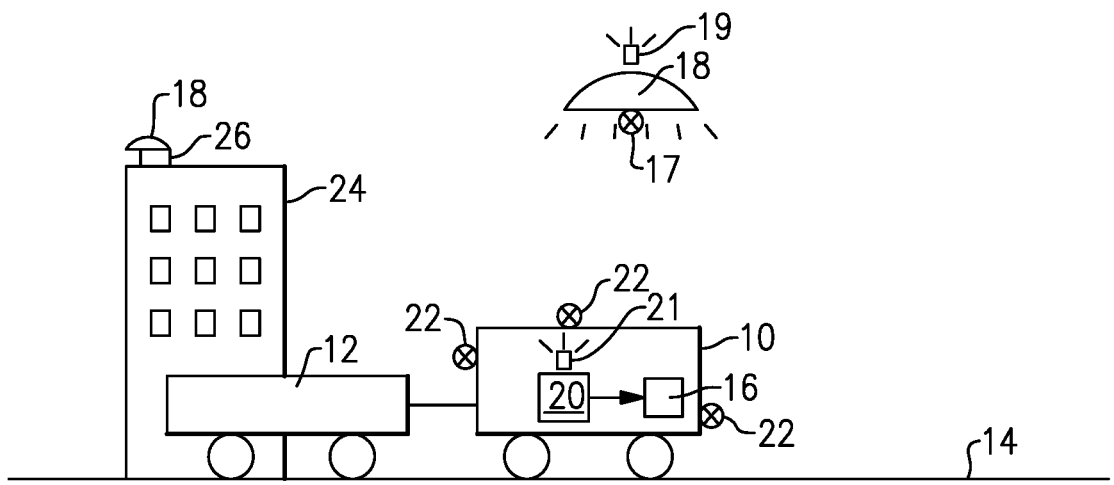
FIG. 1 is a schematic illustration of a vehicle, drone, and visualization system incorporating the subject disclosure.
Figure 2:
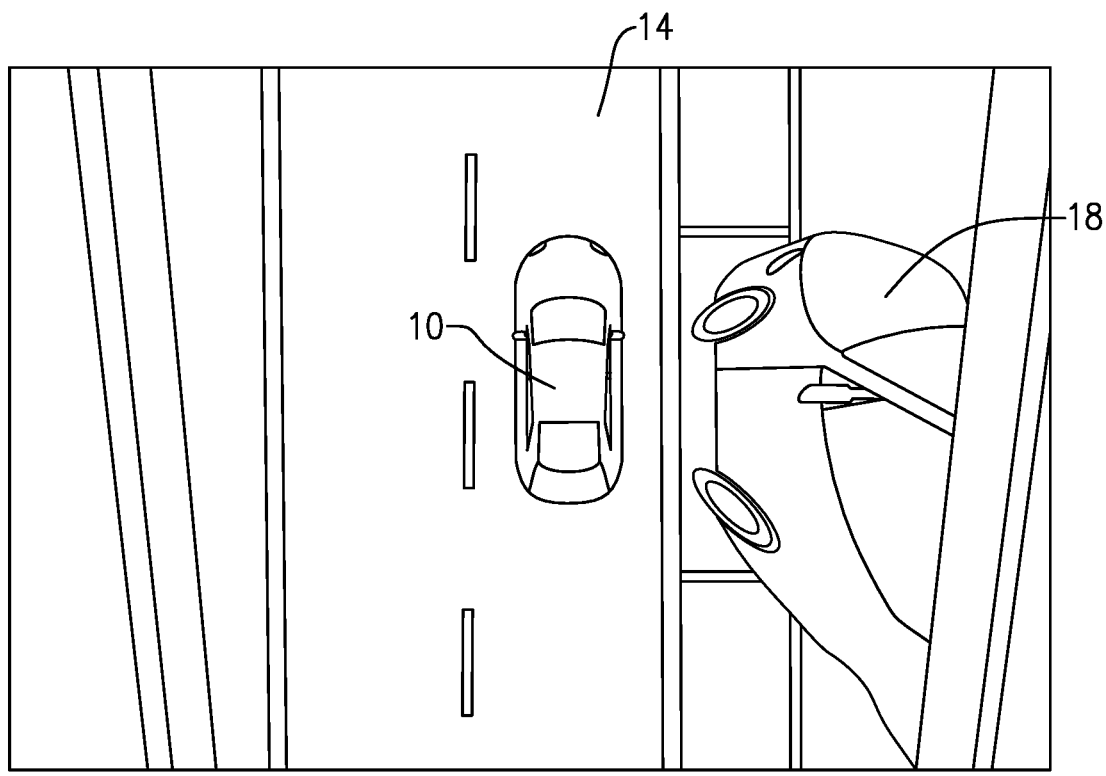
FIG. 2 is an example of an overhead view of vehicle position.

The subject disclosure comprises a visualization system that provides for an improved overhead view of vehicle position for a vehicle occupant. In one example shown in FIG. 1, a vehicle 10 is pulling a trailer 12 along a drivable surface 14, such as a road, driveway, parking lot, or loading dock. The vehicle 10 includes a visual display 16 that is to be viewed by the vehicle occupant. The visual display 16, among other things, is used to show an overhead view of the vehicle 10 in relation to a surrounding environment (see FIG. 2, for example). In the illustrated example, the overhead view is a 360 degree exterior surround view of the vehicle 10. The visual display 16 can include one of an integrated display in the vehicle 10, such as part of an entertainment system. Alternatively, the visual display could include an external display, or a personal mobile device, such as a cell phone, tablet, or laptop.

At least one drone 18 is used to communicate vehicle position data to the visual display 16. The data may first be communicated to a system controller 20, which analyzes the data and then communicates the data to the visual display 16, through the use of a transmitter/receiver 19 on the drone 18 and a transmitter/receiver 21 on the controller 20. In one example, the position data includes images captured by a camera 17 on the drone 18. The position data from the drone 18 can be used to show both the position of the vehicle 10 and the trailer 12 in the overhead view.

In another example, the vehicle 10 is provided with one or more cameras 22 that send data to the controller 20 to generate the vehicle position for the overhead view of the vehicle 10. In the illustrated example, the cameras 22 are associated with the vehicle 10. The controller 20 combines the various images captured by the cameras 22 to generate the overhead view as known. The drone 18 can then be used as needed to enlarge or extend a visualization area to include position data for the trailer 12. Additionally, the cameras 17 on the drone 18 can be used to provide images of areas that are outside a field of view of the cameras 22 on the vehicle 10.

The drone 18 can be selectively or automatically deployed from the vehicle 10, the trailer 12, or a nearby infrastructure 24 such as a building, parking structure, loading dock, etc. In one example, the vehicle occupant maneuvers the drone 18 via Human Machine Interface (HMI), e.g. touch-screen, knob, etc.

As such, the system provides an improved overview view for a driver maneuvering a vehicle with or without a trailer by having a drone 18 fly over a scenario, e.g. vehicle and/or trailer, and displaying the scenario in a bird's eye perspective to the driver via surround view visualization. In one example, the surround view image provided by the drone 18 is by default controlled by the position of the vehicle 10 and/or trailer 12. The H-IMI can then be selectively used to adjust the image by using zoom and shift commands.

Traditional surround view systems use image data coming from the cameras 22 on the vehicle 10 to stitch together a compiled image view through which the driver gets a displayed visualization of the vehicle with any surrounding obstacles from a bird's eye perspective. As discussed above, this helps the driver to visualize the surrounding vehicles in relation to the driver's vehicle and eases maneuvering of the vehicle in tight spaces and parking situations. In certain situations, the driver can choose where the viewpoint of the visualization is to be set.

The subject invention uses the footage from the drone 18 either to enlarge/extend the visualization in a situation where a trailer 12 is hitched to the vehicle 10, or to provide the surround view visualization of the vehicle 10 itself. This is accomplished by the drone 18 hovering above the vehicle or by flying along the vehicle's path. The drone 18 can be selectively or automatically engaged from the vehicle 10, the trailer 12, or the infrastructure 24. A drone-dock 26 can be mounted to the trailer 12, vehicle 10, or the infrastructure 12 to hold the drone 18 when the drone 18 is not deployed. The drone-dock 26 can include charging capability, communication interfaces, etc. as needed for the operation of the drone 18.

This type of visualization system significantly improves driver maneuvering for vehicles 10 with trailers 12. The drone 18 could also be utilized to capture critical scenarios like driveways where there are obstructions and drivers cannot see any lateral traffic or obstacles. Or, the drone 18 could be used in loading dock scenarios where drivers of a truck have to perfectly align the truck/trailer with a loading dock. The drone 18 could also automatically engage in such scenarios and the footage of the drone 18 could be merged with the surround view footage from the cameras 22 on the vehicle 10.

In one example, the drone 18 is maneuvered by the vehicle occupant, e.g. driver, pinching and zooming and scrolling/dragging a surface of a touchscreen into certain directions on the surround view visualization. An algorithm translates this human machine input into a certain drone movement. Input can also be given by any other HMI input such as a 3D input-knob (e.g. iDrive controller) for example.

Figure 3:
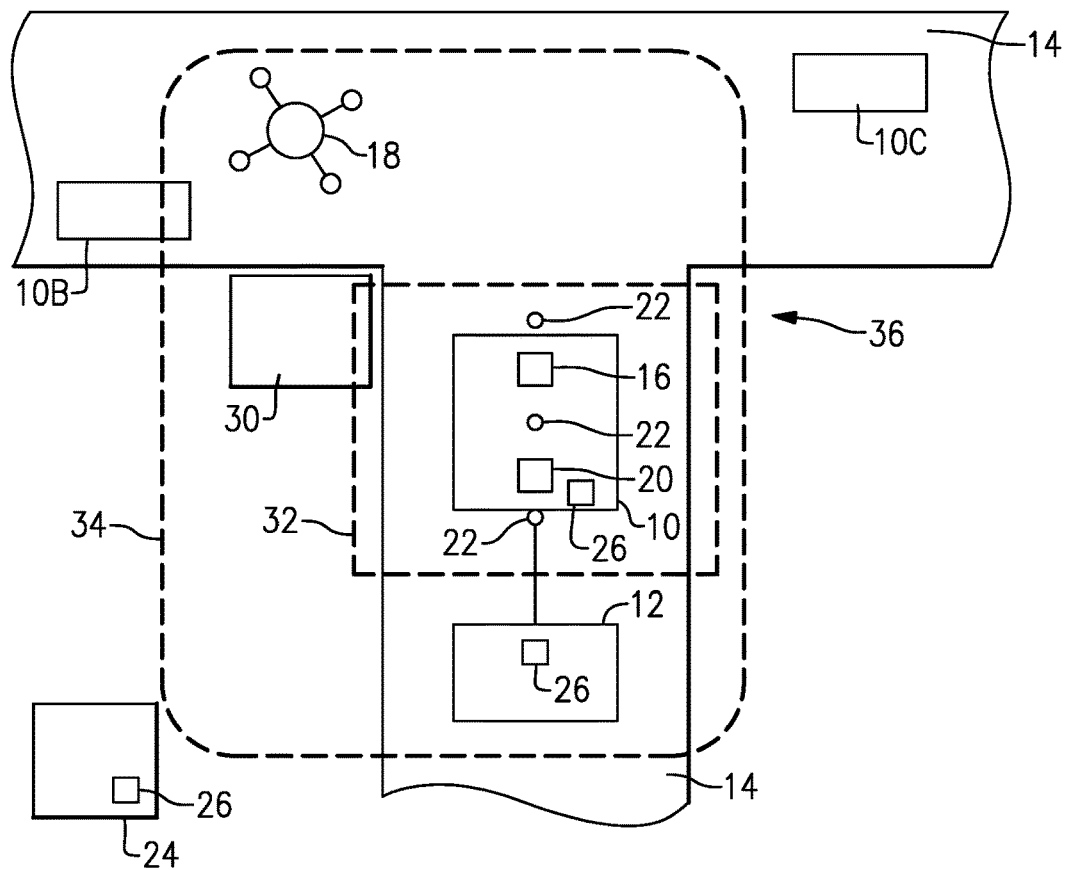
FIG. 3 is a schematic overhead illustration of the vehicle, drone, and visualization system incorporating the subject disclosure.

FIG. 3 is a schematic view of the vehicle 10, drone 18, and visualization system incorporating the subject disclosure. In the illustrated example, the vehicle 10 is located at an intersection 36 of drivable surfaces 14, such as a driveway entering onto a road. When the vehicle 10 is located on a driveway 14 with the intention of pulling out onto the road 14 with traffic traveling in multiple directions (see vehicles 10B and 10C), it is possible that a view of road 14 with multiple direction of traffic may be partially obstructed.

In this example, the view of the vehicle occupant and cameras 22 on the vehicle 10 is obstructed by a structure 30, such as a building or a tree. The dashed lines 32 represents a field of view of the cameras 22 that is obstructed by the structure 30. Therefore, when the drone 18 is deployed, an overhead surround view that is displayed on the visual display 16 can be expanded beyond the structure 30 and the trailer 12 as shown by dashed line 34. Therefore, the overhead surround view generated at least in part from images from the drone 18 expands the field of view of the overhead surround view generated for the visual display 16. This can warn the vehicle occupant of oncoming traffic, such as vehicle 10B, or provide a larger view of the vehicle 10 and trailer 12 on the drivable surface 14.

Figure 4:
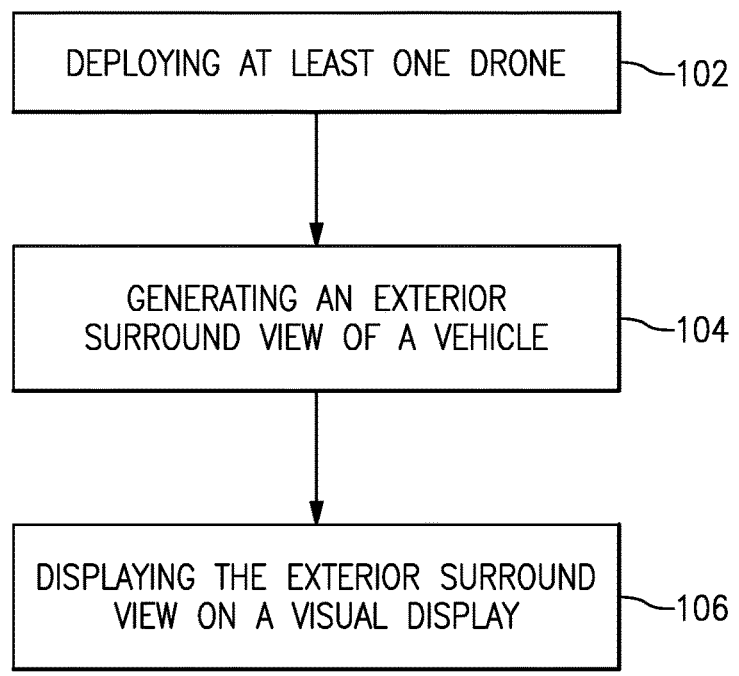
FIG. 4 illustrates a flowchart of a method of providing an overhead surround view according to the subject disclosure.

FIG. 4 illustrates an example method 100 of providing an overhead surround view of the vehicle 10 with or without the trailer 12. The method 100 includes deploying at least one drone 18 when the vehicle 10 encountering a visual obstruction relative to the drivable surface 14. (Step 102). The visual obstruction can occur in a number of circumstances, such as reversing the vehicle 10 or a structure 30 that obstructs a field of view of the vehicle occupant or one of the cameras 22 on the vehicle 10. When the drone 18 is deployed, the drone 18 departs from the drone-dock 26 on at least one of the vehicle 10, the trailer 12 coupled to the vehicle 10, or the infrastructure 24.

The drone 18 can be maneuvered based on a number of criteria. In one example, the drone 18 is maneuvered based on a position of the vehicle 10 on the drivable surface 14. The position of the vehicle 10 may include the vehicle 10 located at the intersection 36 of drivable surfaces 14, such as exiting a narrow driveway onto a wider road, or at a loading dock.

The controller 20 can then generate an overhead view of the driveable surface 14 based on the images received from the drone 18. (Step 104). The overhead view of the driveable surface 14 based on the images from the drone 18 can provide a wider field of view than just the cameras 22 associated with the vehicle 10 or provide a view of the area surrounding the vehicle 10 that is obstructed from the cameras 22. Additionally, the controller 20 can generate the overhead surround view based on both the images received from the drone 18 and the images received by the cameras 22. Therefore, the images from the drone 18 can be used to supplement or extend the field of view captured by the images from the cameras 22 associated with the vehicle 10 or vice versa.

Furthermore, when the overhead surround view is displayed on the visual display 16 (Step 106), the vehicle occupant can modify the overhead view further by interacting with the HMI. For example, the vehicle occupant could zoom in or out of the overhead view, change a direction of the camera 17 on the drone 18 to provide another view, and/or maneuver the drone 18 to provide another view.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An apparatus comprising:
   a controller configured to receive images from a camera on at least one drone and images from at least one vehicle camera mounted to a vehicle and generate an overhead view of the vehicle based on the images received from the at least one drone and the at least one vehicle camera, and cause a display the overhead view on a visual display of the vehicle, the controller generates the overhead view of the vehicle by merging the images received from the at least one drone with the images received from the at least vehicle camera.

2. The apparatus according to claim 1, wherein the vehicle is coupled to a trailer and the overhead view shows both the vehicle and the trailer.

3. The apparatus according to claim 2, wherein the at least one camera generates vehicle position data for the overhead view of the vehicle, and wherein the at least one drone is used to extend a visualization area to include position data for the trailer.

4. The apparatus according to claim 3, wherein the at least one drone is deployed from the trailer or nearby infrastructure.

5. The apparatus according to claim 1, wherein the visual display displays images generated by at least one vehicle camera and the visual display includes one of an integrated vehicle display, an external display, or a mobile device.

6. The apparatus according to claim 5, wherein the at least one vehicle camera includes a plurality of cameras.

7. The apparatus according to claim 1, wherein the overhead view includes a 360 degree surround overhead view of the vehicle.

8. The apparatus according to claim 1, wherein the visual display includes a touch screen and the at least one drone is maneuvered by the touch screen receiving vehicle occupant input.

9. A method of providing an overhead view of a vehicle comprising:
   receiving, images from at least one vehicle camera mounted to the vehicle and at least one drone;
   generating an overhead view of the vehicle based at least on images from the at least one drone and the at least one vehicle camera; and
   causing the overhead view to be displayed on a visual display,
   wherein the overhead view of the vehicle is generated by merging the images from the at least one drone with the images from the at least vehicle camera.

10. The method according to claim 9, further comprising deploying the at least one drone from a docking station on at least one of a trailer coupled to the vehicle or nearby infrastructure.

11. The method according to claim 9, wherein the at least one drone extends a field of view surrounding the vehicle beyond a field of view of the at least one camera on the vehicle.

12. The method according to claim 9, further comprising deploying the at least one drone from a docking station in response to the vehicle encountering a visual obstruction relative to the vehicle, wherein the visual obstruction relative to vehicle occurs when reversing the vehicle along a drivable surface.

13. The method according to claim 12, wherein the visual obstruction relative to the vehicle includes a structure adjacent the drivable surface.

14. The method according to claim 13, wherein deploying the at least one drone includes maneuvering the drone based on a position of the vehicle relative to the drivable surface.

15. The method according to claim 14, wherein the position of the vehicle relative to the drivable surface includes the vehicle at an intersection of multiple drivable surfaces.

16. The method according to claim 15, wherein the vehicle is coupled to a trailer.

17. The method according to claim 9, wherein generating the overhead view includes modifying the overhead view of the vehicle based on input from a vehicle occupant.

18. The method according to claim 17, further comprising maneuvering the at least one drone via HMI to modify the overhead view of the vehicle.

19. The method according to claim 9, wherein the overhead view includes a 360 degree surround exterior view of the vehicle.

* * * * *